(12) United States Patent
Takada

(10) Patent No.: US 11,508,039 B2
(45) Date of Patent: Nov. 22, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Yosuke Takada, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 116 days.

(21) Appl. No.: 17/166,954

(22) Filed: Feb. 3, 2021

(65) Prior Publication Data

US 2021/0256661 A1  Aug. 19, 2021

(30) Foreign Application Priority Data

Feb. 13, 2020 (JP) .............................. JP2020-022178

(51) Int. Cl.
G06K 9/40 (2006.01)
G06T 5/00 (2006.01)
G06T 5/20 (2006.01)
G06V 10/75 (2022.01)

(52) U.S. Cl.
CPC .............. *G06T 5/002* (2013.01); *G06T 5/20* (2013.01); *G06V 10/751* (2022.01)

(58) Field of Classification Search
None
See application file for complete search history.

(56) References Cited

U.S. PATENT DOCUMENTS

| 2008/0273101 | A1* | 11/2008 | Takenaka | H04N 5/367 348/E9.037 |
|---|---|---|---|---|
| 2019/0164008 | A1* | 5/2019 | Yahata | G06V 10/30 |
| 2020/0302577 | A1* | 9/2020 | Nakagawa | H04N 1/409 |
| 2020/0342573 | A1* | 10/2020 | Higaki | G06T 5/002 |
| 2021/0082089 | A1* | 3/2021 | Takada | G06T 7/13 |
| 2022/0180016 | A1* | 6/2022 | Jenks | G06F 30/27 |

OTHER PUBLICATIONS

Marc Lebrun et al.; "Implementation of the Non-Local Bayes (NL-Bayes) Image Denoising Algorithm;" IPOL Image Processing on Line; 3 (2013), pp. 1-42.,http://dx.doi.org/10.5201/ipol.2013.16.

* cited by examiner

*Primary Examiner* — Randolph I Chu
(74) *Attorney, Agent, or Firm* — Canon U.S.A., Inc. IP Division

(57) ABSTRACT

There is provided an apparatus including a first correction unit configured to acquire a first corrected pixel using the covariance matrix, a determination unit configured to determine whether the first corrected pixel is abnormal, a second correction unit configured to acquire a second corrected pixel by performing a second correction on a pixel at a position of the first corrected pixel determined to be abnormal.

20 Claims, 7 Drawing Sheets

IMAGE PROCESSING APPARATUS, IMAGE PROCESSING METHOD, AND STORAGE MEDIUM

BACKGROUND OF THE DISCLOSURE

Field of the Disclosure

The aspect of the embodiments relates to an image processing apparatus configured to reduce noise of an image, an image processing method, and a storage medium.

Description of the Related Art

Conventionally, in order to reduce noise included in a captured image by a camera, focusing on a patch including a plurality of pixels in the image to reduce the noise on a patch basis, according to a known technology. According to "Implementation of the "Non-Local Bayes" (NL-Bayes) Image Denoising Algorithm." Image Processing On Line, 3 (2013), pp. 1-42, a patch group including a plurality of patches in a captured image is selected, a probability model for a patch represented by the average and the covariance matrix of the patch group is generated, and noise reduction processing based on a maximum a posteriori probability method is performed on each of the patches forming the patch group. Subsequently, an output image is generated using the patch subjected to the noise reduction processing. In this process, an inverse covariance matrix that is the inverse matrix of the above-described covariance matrix is calculated, and a pixel value after the noise reduction processing is determined based on the calculated inverse covariance matrix.

However, in the conventional technology, the value of a pixel in the patch after the noise reduction processing may be an abnormal value, so that an output image may fail.

SUMMARY OF THE DISCLOSURE

According to an aspect of the embodiments, an apparatus includes a setting unit configured to set a plurality of patches in the image, a first calculation unit configured to calculate a target patch from the plurality of patches, a second calculation unit configured to calculate a covariance matrix from the plurality of patches and the target patch, a first correction unit configured to acquire a first corrected pixel by performing a first correction on a pixel included in the plurality of patches using the covariance matrix, a determination unit configured to determine whether the first corrected pixel is abnormal, a second correction unit configured to acquire a second corrected pixel by performing a second correction on a pixel at a position of the first corrected pixel determined to be abnormal, and a generation unit configured to generate an output image based on the first corrected pixel or the second corrected pixel.

Further features of the disclosure will become apparent from the following description of exemplary embodiments with reference to the attached drawings.

DESCRIPTION OF THE EMBODIMENTS

Figure 1:
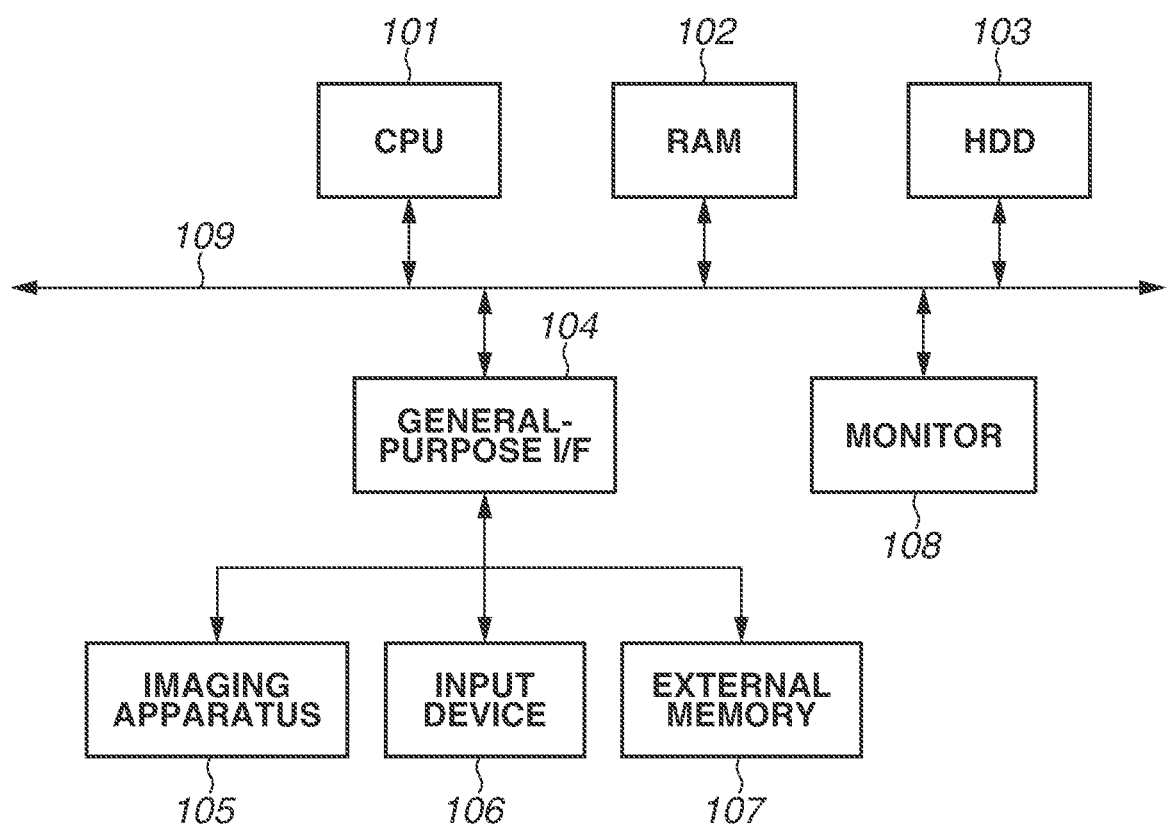
FIG. 1 is a block diagram illustrating a hardware configuration according to a first exemplary embodiment.

In a first exemplary embodiment, there will be described a method of determining whether an abnormality of correction that uses a covariance matrix is present, and avoiding a failure of an output image in a case where the abnormality is present, in patch-based noise reduction processing. FIG. 1 is a block diagram illustrating a hardware configuration according to the present exemplary embodiment. In FIG. 1, an image processing apparatus includes a central processing unit (CPU) 101, a random access memory (RAM) 102, a hard disk drive (HDD) 103, a general-purpose interface (I/F) 104, a monitor 108, and a main bus 109. The general-purpose I/F 104 connects to the main bus 109 an imaging apparatus 105 such as a camera, an input device 106 such as a mouse and a keyboard, and an external memory 107 such as a memory card.

The CPU 101 operates various kinds of software (computer programs) stored in the HDD 103, thereby implementing various types of processing, and these various types of processing will be described below.

First, the CPU 101 activates an image processing application stored in the HDD 103, loads the image processing application into the RAM 102, and displays a user interface (UI) on the monitor 108. Subsequently, various data stored in the HDD 103 and the external memory 107, image data representing an image captured by the imaging apparatus 105, an instruction from the input device 106, and the like are transferred to the RAM 102. Further, based on the processing performed by the image processing application, the data stored in the RAM 102 is subjected to various types of computation, based on a command from the CPU 101. The computation result is displayed on the monitor 108, or stored into the HDD 103 or the external memory 107. Image data stored in the HDD 103 and the external memory 107 may be transferred to the RAM 102. Further, image data transmitted from a server via a network (not illustrated) may be transferred to the RAM 102.

There will be described details of processing of inputting image data to the image processing application, generating noise-reduced image data, and outputting the generated image data, based on a command from the CPU 101 in the above-described configuration. First, a summary of the patch-based noise reduction processing will be described. A partial image obtained by clipping a part of the input image data will be referred to as "patch". A plurality of patches present in a predetermined reference area near a patch of interest is used as reference patches, and will be referred to when the noise reduction processing corresponding to the patch of interest is performed. In the patch-based noise reduction processing, patches having a pixel value distribution similar to a pixel value distribution of the patch of interest are detected as similar patches among the reference patches, and these similar patches are set as a patch group. The patch of interest may be included in the plurality of reference patches. Based on the patch group, the noise reduction processing is executed on each of the similar patches. The similar patches with noise reduced are aggregated, so that an image subjected to the noise reduction processing is generated for the input image data.

Figure 2:
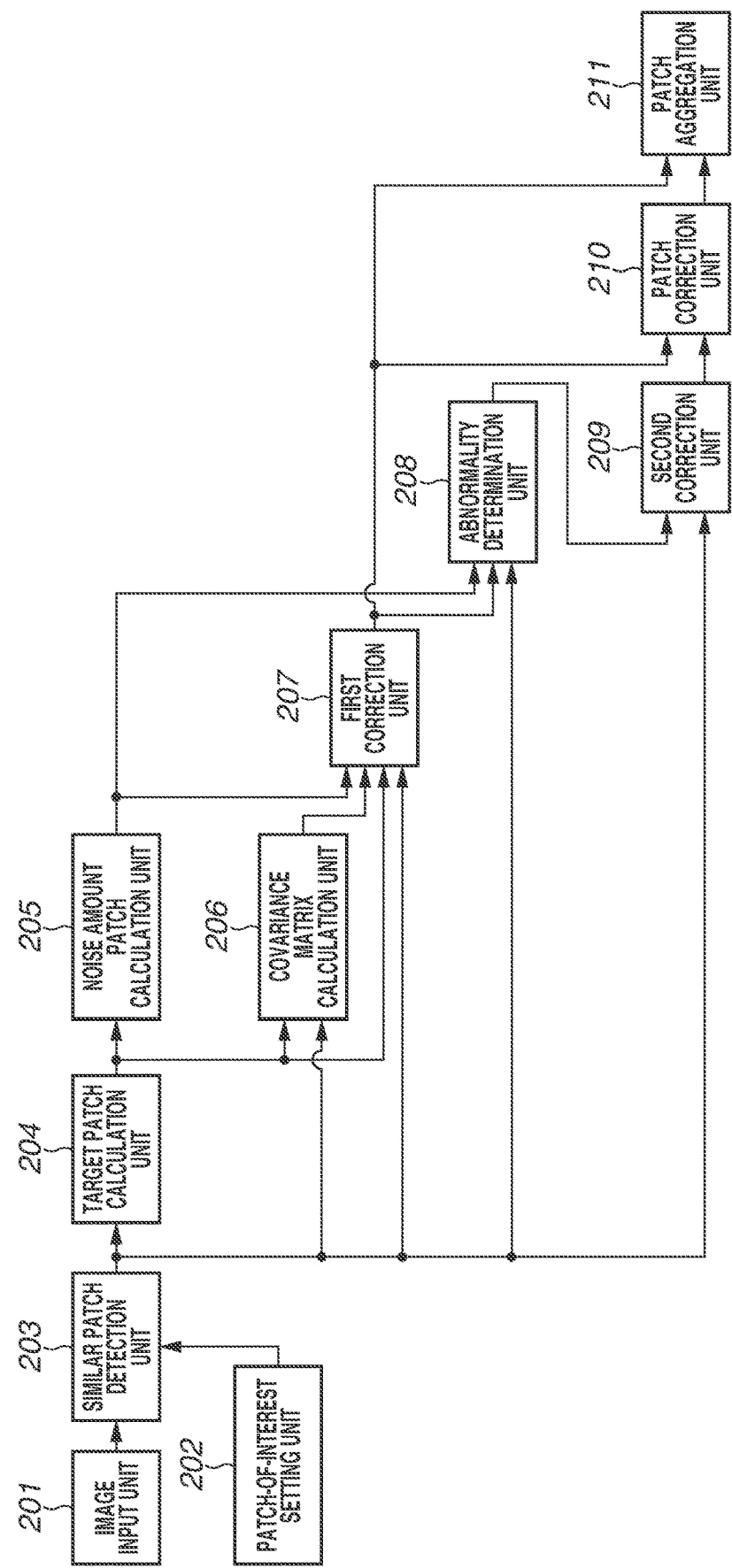
FIG. 2 is a block diagram illustrating an image processing apparatus according to the first exemplary embodiment.

FIG. 2 is a block diagram of the image processing apparatus according to the present exemplary embodiment. An image input unit 201 acquires input image data. A patch-of-interest setting unit 202 clips a partial image having a predetermined shape from the input image data, as a patch of interest. In the present exemplary embodiment, the predetermined shape is a square of six by six pixels. A similar patch detection unit 203 sets a plurality of patches present in a predetermined reference area near the patch of interest as reference patches, and detects a patch similar to the patch of interest as a similar patch, among the reference patches. Each of the reference patches has a shape identical to the shape of the patch of interest. In the present exemplary embodiment, the similar patches include the patch of interest. A target patch calculation unit 204 calculates a target patch based on the plurality of similar patches. A noise amount patch calculation unit 205 calculates a noise amount patch using the target patch. A covariance matrix calculation unit 206 calculates a covariance matrix based on the plurality of similar patches. A first correction unit 207 performs a first correction of correcting a pixel included in the plurality of similar patches using the covariance matrix.

An abnormality determination unit 208 determines whether each of the corrected pixels is abnormal or not (normal), for each of the plurality of similar patches. If there is a pixel determined to be abnormal by the abnormality determination unit 208, a second correction unit 209 performs a second correction different from the first correction, on a pixel at the coordinates identical thereto in the patch before the first correction. A patch correction unit 210 corrects the plurality of first correction results, using the result of the second correction.

A patch aggregation unit 211 aggregates the plurality of corrected similar patches, and generates a noise-reduced output image. The present exemplary embodiment has such a characteristic that an abnormality determination unit is provided to determine an abnormality of a corrected patch for each pixel based on a change before and after correction of a plurality of similar patches, and a different correction is performed to correct the patch in a case where an abnormal pixel is present, in patch-based noise reduction processing. In the present exemplary embodiment, there will be described a configuration in which two different correction processing units are provided, a correction result obtained by each of the two correction processing units is selected based on the result of determination by the abnormality determination unit, and the selected correction result is used. In the present exemplary embodiment, only in a case where the first correction result is determined to be abnormal for a processing target patch, the second correction unit 209 corrects this patch, and this configuration will be described.

Figure 3:
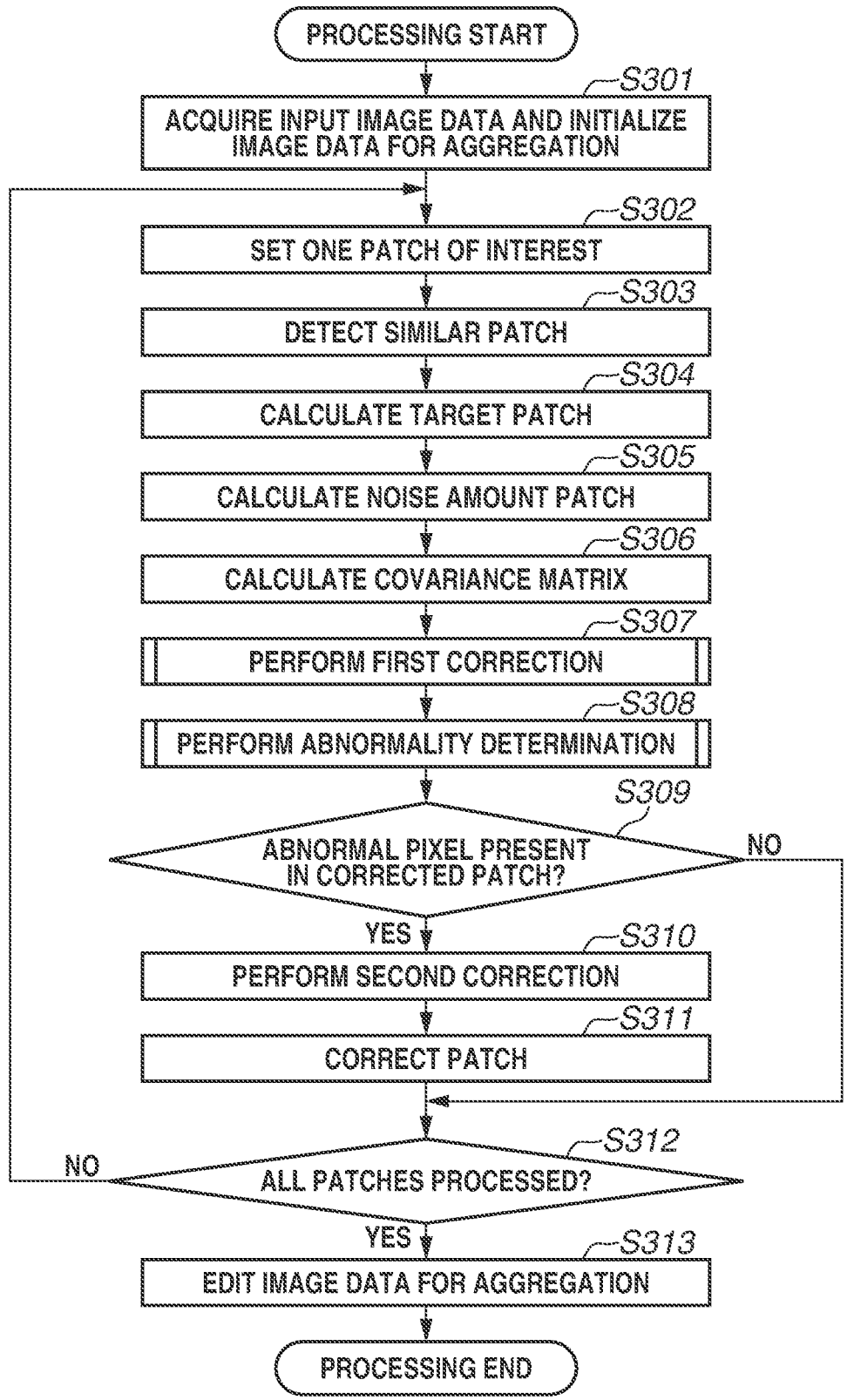
FIG. 3 is a flowchart illustrating a procedure of image processing according to the first exemplary embodiment.

FIG. 3 is a flowchart illustrating a procedure of image processing according to the present exemplary embodiment.

In step S301, the image input unit 201 acquires input image data. Further, the image input unit 201 initializes image data for aggregation with zero. The image data for aggregation includes denominator image data and numerator image data, and both have the same number of pixels as that of the input image data. In step S302, the patch-of-interest setting unit 202 sets one target patch. In general, a plurality of patches can each be set as a patch of interest, for one input image data. The processing in this step and the subsequent steps is repeated with the position of the patch of interest being changed for the next setting. In this case, all the patches may each be set as the patch of interest once, or some of the patches may each be set as the target patch. In the present exemplary embodiment, all the patches are each set as the patch of interest in raster order from upper left. As described above, a partial image of a square of six by six pixels is clipped from the input image data and set as the patch of interest. In other words, the patch of interest includes 36 pixels. In the following description, the patch of interest is represented by a column vector T in which 36 pixels are vertically aligned. In general, in a case where a patch of interest includes M pixels, the patch of interest is represented by a column vector T in which M pixels are vertically aligned.

In step S303, the similar patch detection unit 203 detects a similar patch. First, a plurality of patches present in a predetermined reference area near the patch of interest T is set as reference patches. The shape of each of the reference patches matches the shape of the patch of interest T. In the following description, an ith reference patch is represented by a column vector $R_i$ in which M pixels are vertically aligned. Next, a similarity to the patch of interest T is calculated for each of the plurality of reference patches. The similarity is calculated by the square sum of differences (SSD) of each pixel, of the reference patch and the patch of interest T. Specifically, a similarity $SSD_i$ of the ith reference patch $R_i$ is calculated by the following formula (1).

$$SSD_i = \|R_i - T\|^2 = \sum_{j=1}^{M}(R_1(j) - T(j))^2 \qquad (1)$$

In the formula (1), a jth component (a pixel value) of the column vector T is represented by T(j). As apparent from this calculation method, the smaller the value of the similarity $SSD_i$ is, the more the reference patch $R_i$ is similar to the patch of interest T. Further, some of the plurality of reference patches are each detected as a similar patch, based on the similarity. In the present exemplary embodiment, a patch having a similarity smaller than a predetermined threshold th1 is detected as the similar patch from among the plurality of target patches. In this case, the number of the detected similar patches is N, and an ith similar patch is represented by $P_i$. In the present exemplary embodiment, because the patch of interest includes 36 pixels, the number of the similar patches is 37 at minimum. In a case where the minimum number of patches is not detected, the threshold th1 is increased and the similar patch is detected again based on the increased threshold th1.

In step S304, the target patch calculation unit 204 calculates a target patch Q based on the plurality of similar patches, using in the following formula (2).

$$Q = \frac{1}{N}\sum_{i=1}^{N} P_i \qquad (2)$$

In step S305, the noise amount patch calculation unit 205 calculates a noise amount patch V indicating a noise amount for each of pixels (j) in the patch, using the target patch Q, based on the following formula (3).

$$V_j = kQ_j + V_0 \qquad (3)$$

In this formula (3), k is a constant, $V_0$ is a vector having the same shape as that of the target patch Q, and both are determined and saved in advance.

In step S306, the covariance matrix calculation unit 206 calculates a covariance matrix based on the plurality of similar patches. Using the target patch Q calculated in step S304, a covariance matrix C is calculated by the following formula (4).

$$C = \frac{1}{N-1} \sum_{i=1}^{N} (P_i - Q)(P_i - Q)^t \qquad (4)$$

With this formula (4), a vector representing a patch is regarded as a matrix and computation as the matrix is performed. Further, t is the transposition of the matrix.

Figure 4:
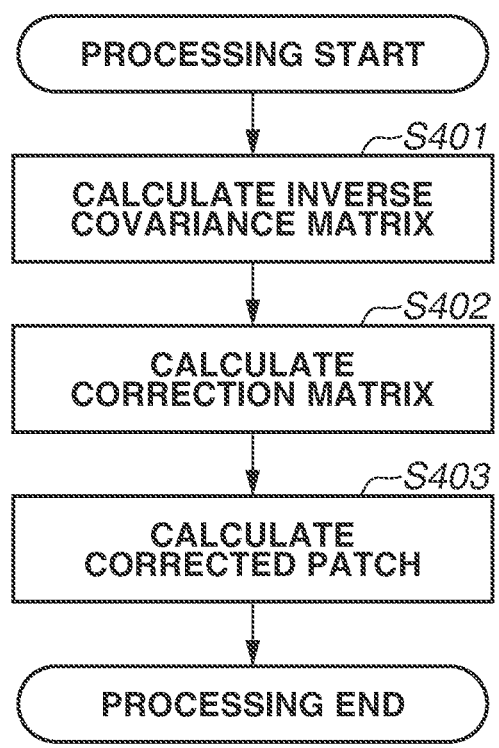
FIG. 4 is a flowchart illustrating a procedure of first correction processing according to the first exemplary embodiment.

In step S307, the first correction unit 207 performs first correction processing on the plurality of similar patches. The first correction processing will be described in detail. FIG. 4 is a flowchart illustrating a procedure of the first correction processing. The first correction unit 207 performs all the steps. In the following description, a similar patch before the first correction is performed is expressed as "pre-first correction patch", and a similar patch after the first correction is performed is expressed as "post-first correction patch".

In step S401, the first correction unit 207 calculates an inverse covariance matrix $C^{-1}$ that is the inverse matrix of the covariance matrix C calculated in step S306.

In step S402, the first correction unit 207 calculates a correction matrix H, using the following formula (5).

$$H = \text{diag}(V)C^{-1} \qquad (5)$$

In this formula (5), diag(V) represents a square diagonal matrix having elements of a vector V on the main diagonal.

In step S403, the first correction unit 207 calculates a corrected patch $O_i$ corresponding to each of the plurality of similar patches $P_i$, using the following formula (6).

$$O_i = P_i - H(P_i - Q) \qquad (2)$$

This ends the description of details of the first correction processing.

Figure 5:
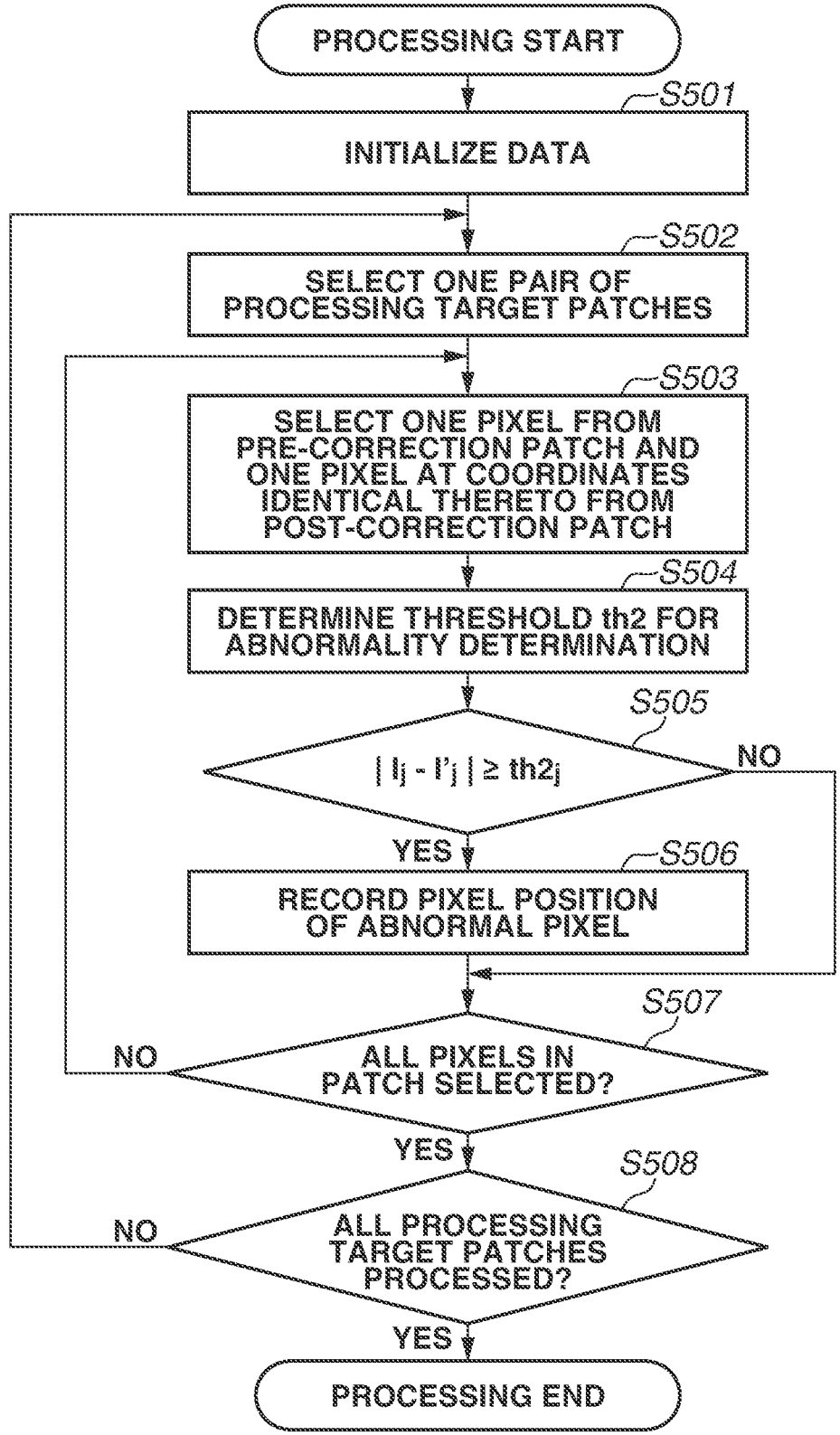
FIG. 5 is a flowchart illustrating a procedure of abnormality determination processing according to the first exemplary embodiment.

Subsequently, referring back to the main image processing flow, in step S308, the abnormality determination unit 208 performs abnormality determination for the post-first correction patch. The abnormality determination processing will be described in detail. FIG. 5 is a flowchart illustrating the abnormality determination. The abnormality determination unit 208 performs all the steps.

In step S501, the abnormality determination unit 208 initializes determination data in which abnormality determination results are stored. In the determination data, the results of determination on whether each of all the processing target patches is normal (="0") or abnormal (="1") and the pixel positions of all the processing target patches are stored.

In step S502, the abnormality determination unit 208 selects one processing target patch from the pre-first correction patches and one processing target patch from the post-first correction patches. The patch selected from the pre-first correction patches is a processing target patch I, and the patch selected from the post-first correction patches is a processing target patch I'. The selected patches have the respective pixel positions matching each other.

In step S503, the abnormality determination unit 208 selects one pixel from the processing target patch I and one pixel at coordinates identical thereto from the processing target patch I', and sets the selected pixels as a pixel $I_j$ and a pixel $I'_j$ in order of selection.

In step S504, the abnormality determination unit 208 determines a threshold th2 for determining whether the pixel is abnormal or not. The threshold th2 for each of the pixels (j) is calculated with the following formula (7), using the noise amount patch V and a coefficient m (m=5 in the present exemplary embodiment) set in advance.

$$\text{th2}_j = m\sqrt{V_j} \qquad (7)$$

In step S505, the abnormality determination unit 208 compares a difference (absolute value) between the pixels $I_j$ and $I'_j$ with the threshold $\text{th2}_j$. If the difference (absolute value) is more than or equal to the threshold $\text{th2}_j$ (YES in step S505), the processing proceeds to step S506. Otherwise (NO in step S505), the processing proceeds to step S507.

In step S506, the abnormality determination unit 208 records the pixel position of the pixel determined to be abnormal (hereinafter, referred to as an "abnormal pixel") in step S505.

In step S507, the abnormality determination unit 208 determines whether all the pixels in the processing target patch have been selected. If all the pixels in the processing target patch have been selected (YES in step S507), the processing proceeds to step S508. Otherwise (NO in step S507), the processing returns to step S503.

In step S508, the abnormality determination unit 208 determines whether all the processing target patches have been processed. If all the processing target patches have been processed (YES in step S508), the abnormality determination processing ends. Otherwise (NO in step S508), the processing returns to step S502. This ends the description of details of the abnormality determination processing.

Referring back to the main image processing flow, in step S309, the abnormality determination unit 208 determines whether an abnormal pixel is present, for all the post-first correction patches, based on the result of the abnormality determination processing in step S308. If the abnormality determination unit 208 determines that an abnormal pixel is present in the post-first correction patch (YES in step S309), the processing proceeds to step S310. If the abnormality determination unit 208 determines that no abnormal pixel is present (NO in step S309), the processing proceeds to step S312.

In step S310, the second correction unit 209 performs the second correction on the pixel (hereinafter, "correction target pixel") located at the same coordinates as those of the abnormal pixel, for the pre-first correction patch. The second correction is the processing different from the first correction, and in the present exemplary embodiment, an average value filter is applied to the correction target pixel and peripheral pixels of the correction target pixel.

In step S311, the patch correction unit 210 corrects the post-first correction patch, using the result of the second correction. More specifically, the patch correction unit 210 replaces the abnormal pixel of the post-first correction patch with the pixel, at the coordinates identical thereto, of the result of the second correction.

In step S312, the second correction unit 209 determines whether all the patches of interest have been processed. If all the patches of interest have been processed (YES in step S312), the processing proceeds to S313. Otherwise (NO in step S312), the processing returns to step S302.

In step S313, the patch aggregation unit 211 edits the image data for aggregation, based on the plurality of corrected patches subjected to the first or second correction. As described above, the image data for aggregation includes the denominator image data and the numerator image data. The patch aggregation unit 211 adds the value of each of all the pixels to the corresponding position in the numerator image data, for each of the plurality of corrected patches $O_i$. This position is a position where each of the pixels is present in the input image data. Further, the patch aggregation unit 211 adds 1 to the same position in the denominator image data.

The ends the description of the flow of the image processing in the present exemplary embodiment.

Even in a case where an abnormality occurs after the noise reduction in the patch-based noise reduction processing that uses the covariance matrix, the abnormality is corrected, so that a desirable output image can be obtained by the above-described processing.

The processing of the present exemplary embodiment is applicable to image data in various formats. For example, the processing is applicable to a monochrome image, and to a color image including a plurality of color components, and is also applicable to an image of a Bayer array.

The similarity between the reference patch and the patch of interest T is calculated using the SSD of each of the pixels, but may be calculated by other methods. For example, the similarity may be calculated with the sum of absolute differences (SAD) of each of the pixels, or the maximum value, the minimum value, the average value, or the median value of the absolute values of the differences between the pixels may be used.

The example in which the average value filter is applied to the pre-first correction patch as the second correction is described, but the second correction may be performed by other methods. For example, a lowpass filter that can reduce noise such as a Gaussian filter may be applied to the pre-first correction patch. Alternatively, for the pre-first correction patch, the values before the correction may be directly output while the pixel determined to be abnormal is left uncorrected, or the average pixel value calculated from some pixels in the patch may be output.

The target patch is calculated using the average of the plurality of similar patches, but it is not limited thereto. For example, the value of each pixel of the target patch may be determined using a value such as the median value or the minimum value of the pixels corresponding to the plurality of similar patches.

In the abnormality determination, one processing target patch is selected from the pre-first correction patches and one processing target patch is selected from the post-first correction patches, and the difference (absolute value) between the pixel values is compared with the threshold th2 for each of the pixels at the identical positions in the respective patches, but an abnormality may be determined by other methods. For example, the difference between the pixel value of each pixel in the processing target patch and the square root of the noise amount patch $V_i$ may be used for the comparison.

In the first exemplary embodiment, the threshold th2 used to determine whether each pixel of the post-first correction patch is abnormal is determined based on the noise amount patch V. The noise amount patch is calculated using the target patch determined from all the similar patches detected in step S303. There is a minimum number as the number of similar patches necessary for the calculation of the covariance matrix, and to satisfy this condition, a similar patch having a low similarity is detected and the target patch is calculated based on the detected similarity patch. This may lead to a reduction of the accuracy of the threshold th2. Therefore, in a second exemplary embodiment, there will be described an example in which a target patch calculated from a similarity patch having a high similarity is used in determining a threshold th2.

More specifically, there will be described an example in which the processing diverge into the first correction and the threshold calculation processing after calculation of a similarity between patches, and a step of collecting patches each having a similarity higher than a predetermined similarity for the threshold calculation is added. Parts common to the first exemplary embodiment will not be described.

Figure 6:
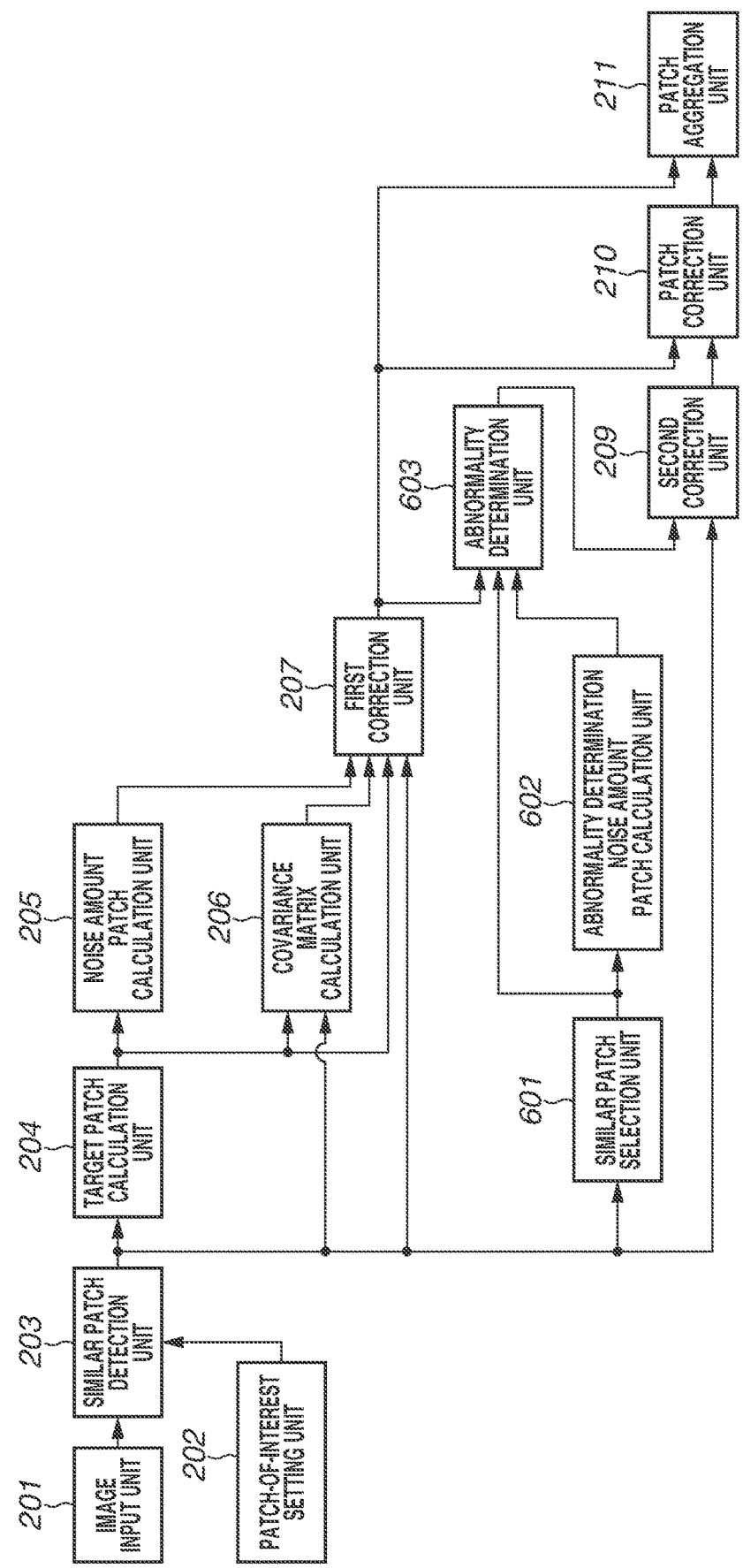
FIG. 6 is a block diagram illustrating an image processing apparatus according to a second exemplary embodiment.

FIG. 6 is a block diagram illustrating an image processing apparatus according to the present exemplary embodiment. In one embodiment, a similar patch selection unit 601 selects only a patch having a high similarity from similar patches detected by a similar patch detection unit 203. An abnormality determination noise amount patch calculation unit 602 calculates a target patch based on the selected similar patch and calculates a noise amount patch using the calculated target patch. An abnormality determination unit 603 determines whether each pixel is abnormal or not (normal) for each of a plurality of corrected similar patches.

Figure 7:
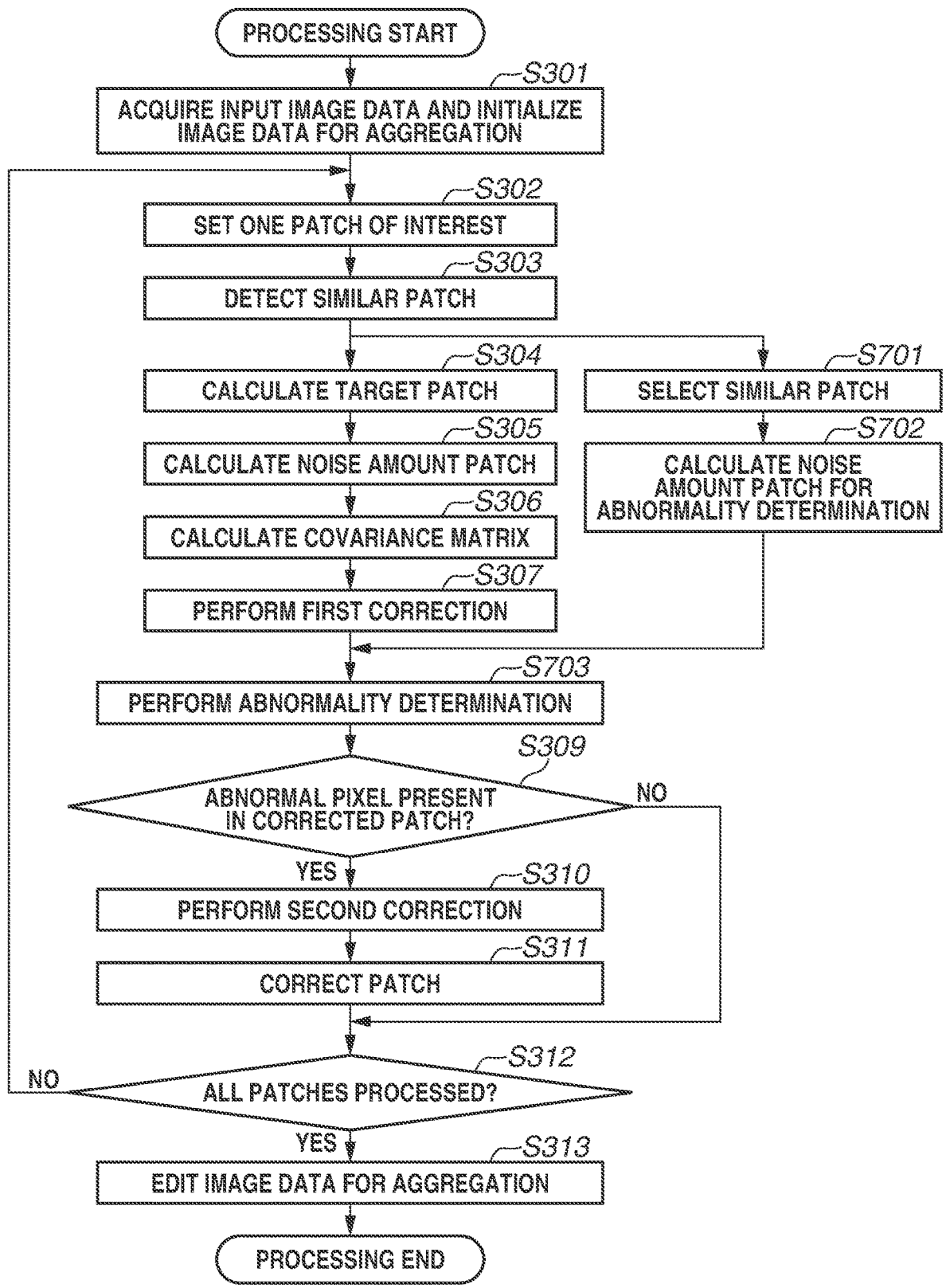
FIG. 7 is a flowchart illustrating a procedure of image processing according to the second exemplary embodiment.

FIG. 7 is a flowchart illustrating a procedure of image processing according to the present exemplary embodiment.

In one embodiment, in step S701, the similar patch selection unit 601 selects only a patch having a high similarity from similar patches. More specifically, the threshold th1 is reduced (e.g., multiplied by a coefficient c=0.5), and a similar patch having a similarity smaller than the threshold th1 is selected. Alternatively, the top x % (x=60) having a high similarity may be selected as the similar patches.

In step S702, the abnormality determination noise amount patch calculation unit 602 takes an average value for each pixel for all the selected similarity patches and calculates a target patch Q' based on the average value, and further calculates a noise amount patch V', using the following formula (8).

$$V'_j = kQ'_j + V_0 \qquad (8)$$

In step S703, the abnormality determination unit 603 performs abnormality determination for a post-first correction patch. Step S504 is a point different from the first exemplary embodiment and will be described. In the second exemplary embodiment, the threshold th2 is calculated for each of pixels (j) with the following formula (9), using the noise amount patch V' and a coefficient m (m=5 in the present exemplary embodiment) set in advance.

$$\text{th2}_j = m\sqrt{V'_j} \qquad (9)$$

As described above, the noise amount patch suitable for the first correction processing and the threshold calculation processing is calculated, so that an abnormality result of the first correction processing is corrected with higher accuracy, and a desirable output image can be obtained.

OTHER EXEMPLARY EMBODIMENTS

The aspect of the disclosure can also be implemented by supplying a program that implements one or more functions of each of the above-described exemplary embodiments to a system or apparatus via a network or storage medium, and causing one or more processors in a computer of the system or apparatus to read out the program and execute the read-out program.

The aspect of the embodiments can also be implemented by a circuit (e.g., an application-specific integrated circuit (ASIC)) for implementing the one or more functions.

The above-described exemplary embodiments are merely examples of an embodiment for implementing the disclosure, and the technical scope of the disclosure is not to be interpreted as being limited by these exemplary embodiments.

In other words, the aspect of the embodiments can be implemented in various forms without departing from the technical ideas or the main characteristics thereof. For example, a part of a quadratic function coefficient computation unit may be operated by a computation start signal provided by a higher control unit and a computation result may be held, so that power can be reduced by referring to this held data during input of an image.

According to the present disclosure, a failure of an output image after the noise reduction processing can be controlled.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-022178, filed Feb. 13, 2020, which is hereby incorporated by reference herein in its entirety.

What is claimed is:

1. An apparatus comprising:
a setting unit configured to set a plurality of patches in an image;
a first calculation unit configured to calculate a target patch from the plurality of patches;
a second calculation unit configured to calculate a covariance matrix from the plurality of patches and the target patch;
a first correction unit configured to acquire a first corrected pixel by performing a first correction on a pixel included in the plurality of patches using the covariance matrix;
a determination unit configured to determine whether the first corrected pixel is abnormal;
a second correction unit configured to acquire a second corrected pixel by performing a second correction on a pixel at a position of the first corrected pixel determined to be abnormal; and
a generation unit configured to generate an output image based on the first corrected pixel or the second corrected pixel.

2. The apparatus according to claim 1, wherein the first calculation unit calculates the target patch based on an average of the plurality of patches.

3. The apparatus according to claim 1, wherein the first calculation unit calculates the target patch based on an average of a plurality of patches selected, based on a similarity, from the plurality of patches.

4. The apparatus according to claim 1, wherein the determination unit determines that the first corrected pixel is abnormal in a case where a difference between the pixel included in the plurality of patches and the first corrected pixel is greater than a predetermined threshold.

5. The apparatus according to claim 4, wherein the predetermined threshold is a value different for each pixel and calculated based on the target patch and a noise amount.

6. The apparatus according to claim 1, wherein the second correction unit uses an average value of pixels before the first correction in a patch including the first corrected pixel determined to be abnormal, as the second corrected pixel.

7. The apparatus according to claim 1, wherein the second correction unit acquires the second corrected pixel by applying a lowpass filter to a pixel before the first correction in a patch including the first corrected pixel determined to be abnormal.

8. The apparatus according to claim 1, wherein the second correction unit replaces the pixel at the position of the first corrected pixel determined to be abnormal with the second corrected pixel.

9. A method comprising:
setting a plurality of patches in an image;
performing a first calculation of calculating a target patch from the plurality of patches;
performing a second calculation of calculating a covariance matrix from the plurality of patches and the target patch;
performing a first correction on a pixel included in the plurality of patches using the covariance matrix, and acquiring a first corrected pixel;
determining whether the first corrected pixel is abnormal;
performing a second correction on a pixel at a position of the first corrected pixel determined to be abnormal, and acquiring a second corrected pixel; and
generating an output image based on the first corrected pixel or the second corrected pixel.

10. The method according to claim 9, wherein the first calculation calculates the target patch based on an average of the plurality of patches or based on an average of a plurality of patches selected, based on a similarity, from the plurality of patches.

11. The method according to claim 9, wherein the determining determines that the first corrected pixel is abnormal in a case where a difference between the pixel included in the plurality of patches and the first corrected pixel is greater than a predetermined threshold.

12. The method according to claim 9, wherein the second correction uses an average value of pixels before the first correction in a patch including the first corrected pixel determined to be abnormal, as the second corrected pixel.

13. The method according to claim 9, wherein the second correction acquires the second corrected pixel by applying a lowpass filter to a pixel before the first correction in a patch including the first corrected pixel determined to be abnormal.

14. The method according to claim 9, wherein the second correction replaces the pixel at the position of the first corrected pixel determined to be abnormal with the second corrected pixel.

15. A non-transitory computer-readable storage medium storing instructions that, when executed by a computer, cause the computer to perform a method, the method comprising:

setting a plurality of patches in an image;
performing a first calculation of calculating a target patch from the plurality of patches;
performing a second calculation of calculating a covariance matrix from the plurality of patches and the target patch;
performing a first correction on a pixel included in the plurality of patches using the covariance matrix, and acquiring a first corrected pixel;
determining whether the first corrected pixel is abnormal;
performing a second correction on a pixel at a position of the first corrected pixel determined to be abnormal, and acquiring a second corrected pixel; and
generating an output image based on the first corrected pixel or the second corrected pixel.

16. The non-transitory computer-readable storage medium according to claim 15, wherein the first calculation calculates the target patch based on an average of the plurality of patches or based on an average of a plurality of patches selected, based on a similarity, from the plurality of patches.

17. The non-transitory computer-readable storage medium according to claim 15, wherein the determining determines that the first corrected pixel is abnormal in a case where a difference between the pixel included in the plurality of patches and the first corrected pixel is greater than a predetermined threshold.

18. The non-transitory computer-readable storage medium according to claim 15, wherein the second correction uses an average value of pixels before the first correction in a patch including the first corrected pixel determined to be abnormal, as the second corrected pixel.

19. The non-transitory computer-readable storage medium according to claim 15, wherein the second correction acquires the second corrected pixel by applying a lowpass filter to a pixel before the first correction in a patch including the first corrected pixel determined to be abnormal.

20. The non-transitory computer-readable storage medium according to claim 15, wherein the second correction replaces the pixel at the position of the first corrected pixel determined to be abnormal with the second corrected pixel.

* * * * *